United States Patent [19]

Morris, Jr.

[11] Patent Number: 4,822,231
[45] Date of Patent: Apr. 18, 1989

[54] SPACING MEMBER PLACEMENT APPARATUS

[76] Inventor: Harvey R. Morris, Jr., 6772 Celeste Rd., Saraland, Ala. 36571

[21] Appl. No.: 937,636

[22] Filed: Dec. 3, 1986

[51] Int. Cl.$^4$ ............................................. B65G 57/26
[52] U.S. Cl. .................................. 414/789.5; 198/369; 221/248; 414/224; 414/795.4; 414/798
[58] Field of Search ................ 414/42, 112, 126, 222, 414/224; 221/248, 249; 198/369, 406, 421

[56] References Cited

U.S. PATENT DOCUMENTS

| | | | |
|---|---|---|---|
| 1,796,575 | 3/1931 | Morgan | 414/42 X |
| 2,497,874 | 2/1950 | Evans et al. | 198/369 |
| 2,613,824 | 10/1952 | Tallman | 414/42 X |
| 2,820,573 | 1/1958 | McConnell | |
| 2,858,046 | 10/1958 | Pollmann | |
| 3,169,646 | 2/1965 | Mason | 414/42 X |
| 3,352,434 | 11/1967 | Zuercher | 414/42 X |
| 3,643,621 | 2/1972 | Newnes | 414/42 X |
| 3,738,510 | 6/1973 | Mason | 414/42 X |
| 3,823,834 | 7/1974 | Rysti | 414/42 |
| 3,904,044 | 9/1975 | Lunden | 414/42 X |
| 3,968,886 | 7/1976 | Leon | 414/42 |
| 4,003,462 | 1/1977 | Perrott | 198/369 |
| 4,090,618 | 5/1978 | Lehmann | 414/42 X |
| 4,144,976 | 3/1979 | Rysti | 414/42 |
| 4,195,737 | 4/1980 | Rysti | 209/521 |
| 4,219,120 | 8/1980 | Rysti | 209/521 |
| 4,232,778 | 11/1980 | Rysti | 198/443 |
| 4,264,253 | 4/1981 | Kennison | 414/42 |
| 4,324,521 | 4/1982 | Lunden et al. | 414/42 |
| 4,360,303 | 11/1982 | Rysti | 414/42 |
| 4,671,724 | 6/1987 | Bolton | 414/126 |

Primary Examiner—Leslie J. Paperner
Attorney, Agent, or Firm—Cushman, Darby & Cushman

[57] ABSTRACT

Apparatus for placing at spaced intervals spacing members on top of articles being stacked in layers is provided with a loading station having a conveyor for moving elongated spacing members to a plurality of spaced magazine stations; each magazine station is provided with a selection conveyor which can be individually operated to load each magazine with the spacing members; beneath each magazine two pair of guiding arms are provided, one of which is actuated by a rotary shaft to remove a spacing member from the magazine and to pass it between the guiding arms to thereby effect delivery of the spacing member to a desired location on the top of the layer being stacked therebeneath.

19 Claims, 5 Drawing Sheets

SPACING MEMBER PLACEMENT APPARATUS

BACKGROUND AND SUMMARY OF THE INVENTION

The present invention relates to article handling apparatus and, specifically, to apparatus for placing elongated objects such as spacing sticks at spaced intervals on the top layer of articles being stacked. In a specific embodiment, the present invention is employed to place spacing sticks between layers of green cut lumber to provide ventilation spaces between the layers of lumber which will greatly improve circulation of drying air between the layers when the stack is placed in a drying kiln.

In many industrial operations, it is desirable and sometimes necessary to place spacing members between layers of products or goods or raw material that is being stacked for subsequent treatment or even for storage. The procedure for placing spacing members is often time consuming and very labor intensive, particularly where large surface areas must be traversed by the spacing members at fixed intervals. In one such environment where cut lumber is delivered from a sawmill cutting operation to a drying kiln, the use of spacing members is highly desirable so that the operation of the kiln can be efficiently conducted. However, while the lumber cutting operation can be highly automated, no satisfactory apparatus has been developed to insert suitable spacing members in precise locations over the top of a layer of cut raw or green lumber in constructing a stack of raw lumber which is to be inserted in a drying kiln to cure the lumber. While it has been found that the use of spacing members in the operation of a wood drying kiln is essential for proper operation of the kiln and proper curing of the green lumber, manual labor has been almost exclusively employed to insert spacing sticks in adjacent layers of the stacked lumber. This has resulted in a severe restriction in the throughput production capacity of a lumber mill.

Attempts to solve the production problem resulting from the need to insert spacing members in a stack being formed have, in general, not produced apparatus that can locate with any precision spacing members in locations desired to enable the construction of a stable stack of material. Precise positioning of the spacing member is important in a wood curing operation since an unstable stack will often induce bowing in the improperly supported wood pieces during drying. In addition, other attempts have suffered from the disadvantage that only very precisely formed spacing members can be employed which, clearly, results in increased costs for the user of such apparatus.

It is an object of the present invention to provide a material handling apparatus which can be employed to locate with precision any desired number of spacing members on top of a layer or in a plane in precisely defined locations very rapidly and without the need for precisely manufactured spacing members.

According to the present invention, in a preferred embodiment, a plurality of individual magazines for receiving spacing members are disposed above a stacking area. At the lower portion of each magazine, which may be gravity operated, arrays of pairs of guide arms are provided which will operate to remove a single spacing member from an associated magazine and deliver the spacing member to a precise location on a subjacent top layer of the articles being stacked thereunder. The guide means are then withdrawn to permit a worker to insert another layer of articles on top of the thus disposed and properly spaced spacing members. The operation may be repeated as desired until a stack of a desired size is completed. The formed stack is then removed for subsequent processing as the nature of the material will require. The guide arms are all of identical construction and each will include a first guide arm which has one end pivotally secured to the periphery of a cam disk which is mounted on a drive shaft. A second guide arm has one of its ends pivotally mounted on a fixed axis vertically above and slightly offset from the first guide arm. A second guide arm has a slightly longer length than the first guide arm and has its lower free end provided with a hook to grab and restrain movement of a spacing member disposed between the guide arms. The guide arms interengage intermediate their ends so that when the lower guide arm is moved upwardly by its cam disk operating means, it will, during its travel, engage the upper guide arm and lift the upper guide arm upwardly away from the layer being stacked.

With this arrangement, spacing members can be placed one above each other in each layer of articles being stacked to thereby provide a very stable stacked arrangement which will facilitate subsequent handling such as movement of the formed stack to a subsequent operation such as a drying kiln. In addition, the apparatus can be highly automated so that only a single worker will be required to operate the stack placing apparatus without sacrificing accuracy and speed in the placement of the spacing members in the stack being formed. In addition, the apparatus of the present invention, as described in more detail below, may employ spacing members that vary widely in their external shapes and yet which can be handled with great precision with the apparatus of the present invention.

The foregoing and other advantages will become apparent as further consideration is given to the following detailed description taken in conjunction with the accompanying drawings in which:

DETAILED DESCRIPTION OF THE INVENTION

Figure 1:
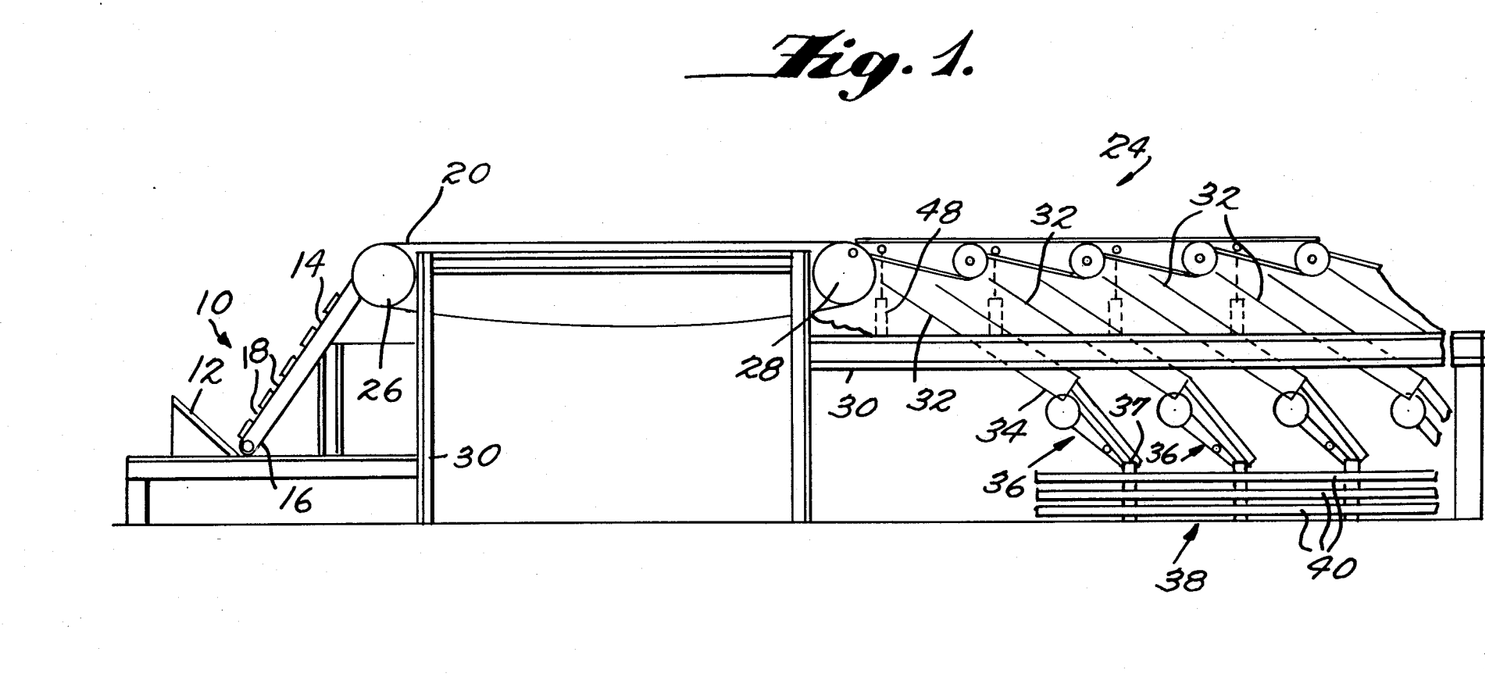
FIG. 1 is a schematic view in elevation of the apparatus of the present invention.

With reference now to the drawings wherein like numerals designate corresponding parts throughout the several views, there is shown in FIG. 1 in side elevation a schematic illustration of one arrangement of the apparatus of the present invention. As shown, a loading station 10 is provided where a substantially random loading of individual spacing members is carried out in a bin 12. While the illustrated embodiment is adapted chiefly for handling wooden spacing sticks of the type used to space layers of cut lengths of wood to facilitate ventilation when the green wood is cured in a kiln, it will be understood by those skilled in the material handling art that, with minor modifications, the apparatus of the present invention can be employed to place with precision spacing members or other articles in reasonably precise locations in stacked arrays of goods or products.

To facilitate feeding of the spacing members loaded at 12, a sloped pair of chain conveyors, one of which is indicated at 14, has its lower end 16 inserted into the bin, as shown. Parallel recesses 18 are provided on the chains 14 to lift individual spacing members up the conveyor 14 to a horizontal chain conveyor which may be in the form of spaced parallel endless chains 20, which will accumulate the spacing members in a horizontal direction for feeding to the magazine loading conveyors in the stacking area 24. The horizontal conveyor 20 will permit the operator to visually inspect the spacing members passing thereover between the pulleys 26 and 28 of the conveyor 20 and will also permit the rearrangement of the spacing members manually by the operator should such rearrangement be required for any reason. As will be evident to those skilled in the art, suitable drive motors and linkages can be mounted on the frame 30 for driving the conveyors 14 and 20 in a conventional manner. Downstream of the conveyor 20, there are provided distributor conveyor means which will receive the spacing members and will operate to selectively feed spacing members into a subjacently located magazines 32 until an appropriate number of spacing members have accumulated in each magazine 32.

Each magazine 32 has as its lower end 34 an array of guide arms 36 which are operable to place a spacing member 37 on a layer of articles 38 being stacked. As noted above, the guide arms 36 are sequentially operable to remove a single spacing member from an associated magazine and deposit the spacing member on the subjacent layer in a depository location and then to retract to permit a subsequent layer of articles to be placed on the just located spacing members. In this manner, a plurality of individual layers 40 of articles can be built up in the stacking area beneath the magazines 32. It will be appreciated by those skilled in this art that the dimensions of the various implements employed as well as the size of the stacking layers and stacking area can be proportionately expanded or decreased in size depending on the individual size of the articles being stacked.

Figure 2:
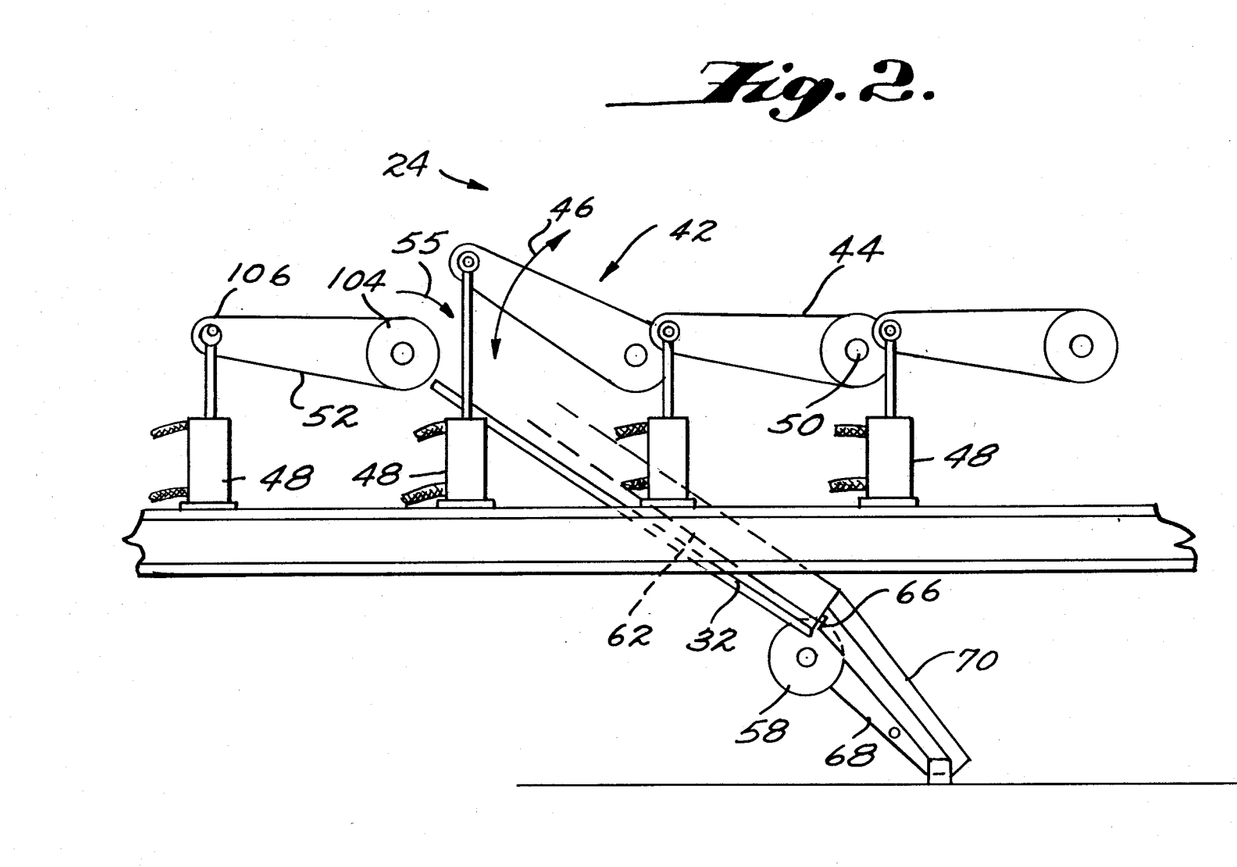
FIG. 2 is a side detailed view of one magazine station, associated conveyors and guide arms of the spacing member placing apparatus of the present invention.

Turning now to FIG. 2, there is illustrated the cooperation between a single magazine 32 and the distributor conveyor means 42 in the magazine station 24 of the present invention.

Specifically, the distributor conveyor means 42 comprises a plurality of individual overlapping chain link conveyors 44, each of which has its leading edge movable upward and downwardly in the direction of arrow 46 by a moving means in the form of, for example, a pneumatic or hydraulic piston and cylinder arrangement 48 mounted on an upper portion of the frame 30. As will be evident from a consideration of FIG. 2, the rear pulley 50 is pivotally mounted on a shaft as is more fully described in connection with FIG. 5. In the operation of the apparatus as thus far described, when it is desired to load an individual magazine 32 with spacing members, a selected conveyor shaft 44 will be lifted to the position illustrated in FIG. 2 by its associated moving cylinder 48 so that the spacing members carried by the immediately preceeding chain conveyor 52 will commence feeding spacing members in the direction of arrow 55 over the leading edge of the magazine 32. Spaced along the lower edge 56 of the magazine 32, are at least two camming disks 58 mounted on a shaft 60. The disks 58 are rotatable with the shaft 60 as will be described below. The descending spacing members, which are kept flat and in single file by a pair of guide bars 62 mounted just above the plate defining the magazine 32, will abut the edge of at least two spaced disks 58 and come to rest thereagainst. As described in more detail below, when the camming disks 58 are rotated clockwise as viewed in FIG. 2, a picking means in the form of a notch 66 will engage the lowermost one of the spacing members and lift it away from the magazine means for feeding between the guide arms 68 and 70. A pair of pinch devices, one of which is shown at 71, are provided to pinch the spacing members adjacent the lowermost one where the lowermost spacing member is being removed by the notch 66. Each device 71 may be a pneumatic ram mounted on frame 30 adjacent the edge 56 of each magazine. The operation of the devices 71 may be in timed sequence with rotation of the disks 58 or actuation may be manual by an observing worker as needed. Preferably, each pneumatic ram is operated by a slide valve which controls a supply and drain of gas under pressure to each side of the piston in each cylinder. Also, release of each pinch device from each spacing member is accomplished gradually by slowly bleeding gas from the upper side of the piston to prevent abrupt sliding of the spacing members down the surface of the magazine and against the associated disks 58.

Figure 3:
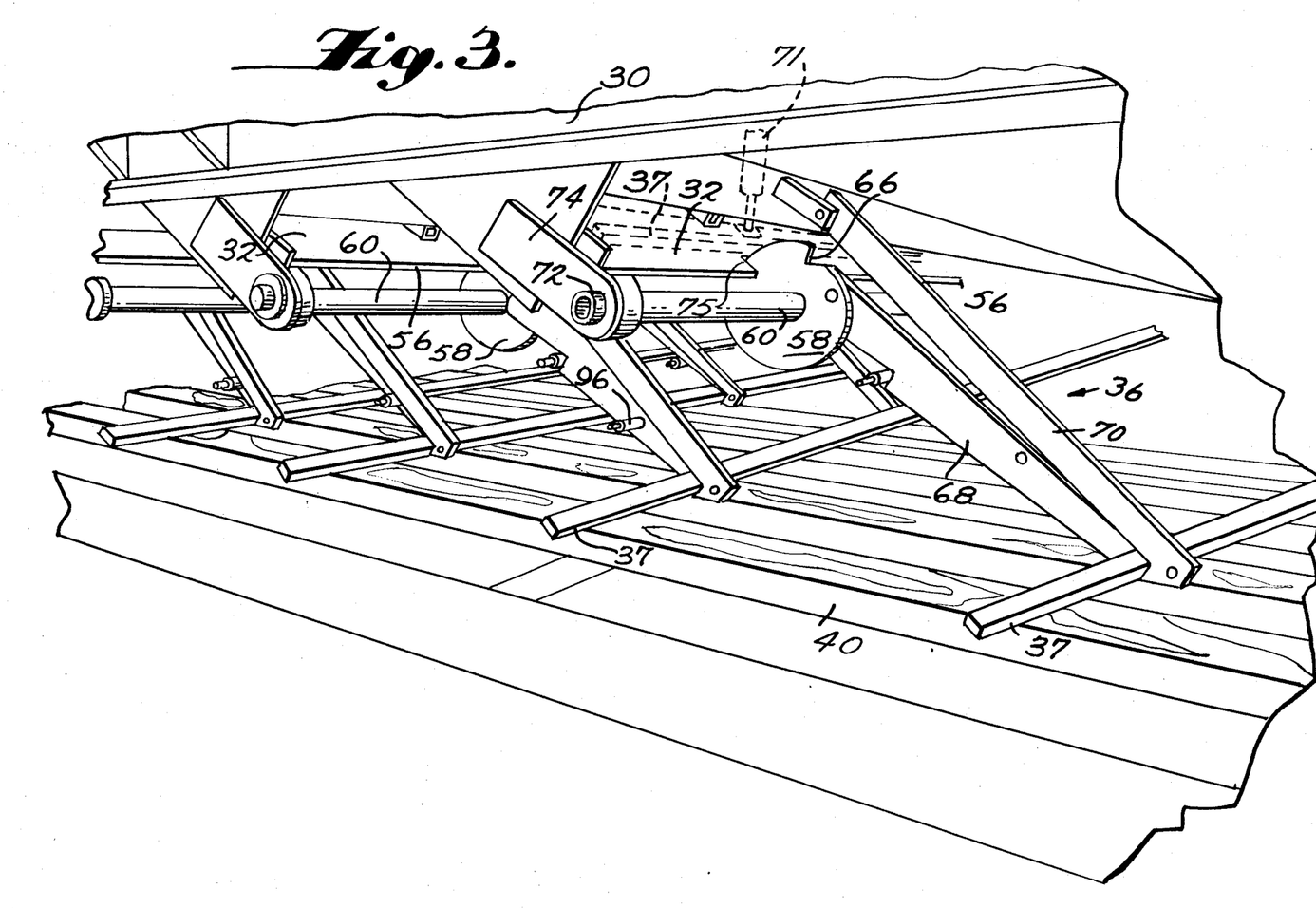
FIG. 3 is a perspective view similar to FIG. 2 but showing in enlarged detail the relative dispositions of the guide arms and operating shafts thereof of the present invention.

With reference now to FIG. 3, there is shown a perspective view, the array of guide arms disposed under the sets of magazines 32 described above. It will be apparent, each shaft 60 may be provided with two or more camming disks 58 which are spaced apart along the shaft 60 to accommodate two or more sets of the guide arms 68 and 70. This is especially beneficial where the spacing members 37, as illustrated, are elongated stick members which are being placed on top of a layer of cut green lumber 40. As will be described in more detail below, in operation, the shaft 60 which are rotatably mounted in bearings 72 and extend downwardly on frame members 77 from the frame body 30 can be rotated by any suitable means. For example, the ends of the shaft 60 may have crank arms connected thereto pivotally connected to hydraulic or pneumatic rams which will move the ends of the crank arms to rotate the shafts through a selected angular rotation corresponding to movement of the picking notch 66 on each disk 58 from a position below a slot 75 formed in the lower edge 56 of each magazine through a clockwise rotation, as viewed in FIG. 3, sufficient to discharge a spacing member 37 carried in each notch 66 to a position where the spacing member will slide downwardly between the arms 68 and 70 to the lower ends thereof. The camming disk 58 would then be rotated counterclockwise until the notches 66 pass through the slot 75 of each magazines lower edge 56.

Figure 4:
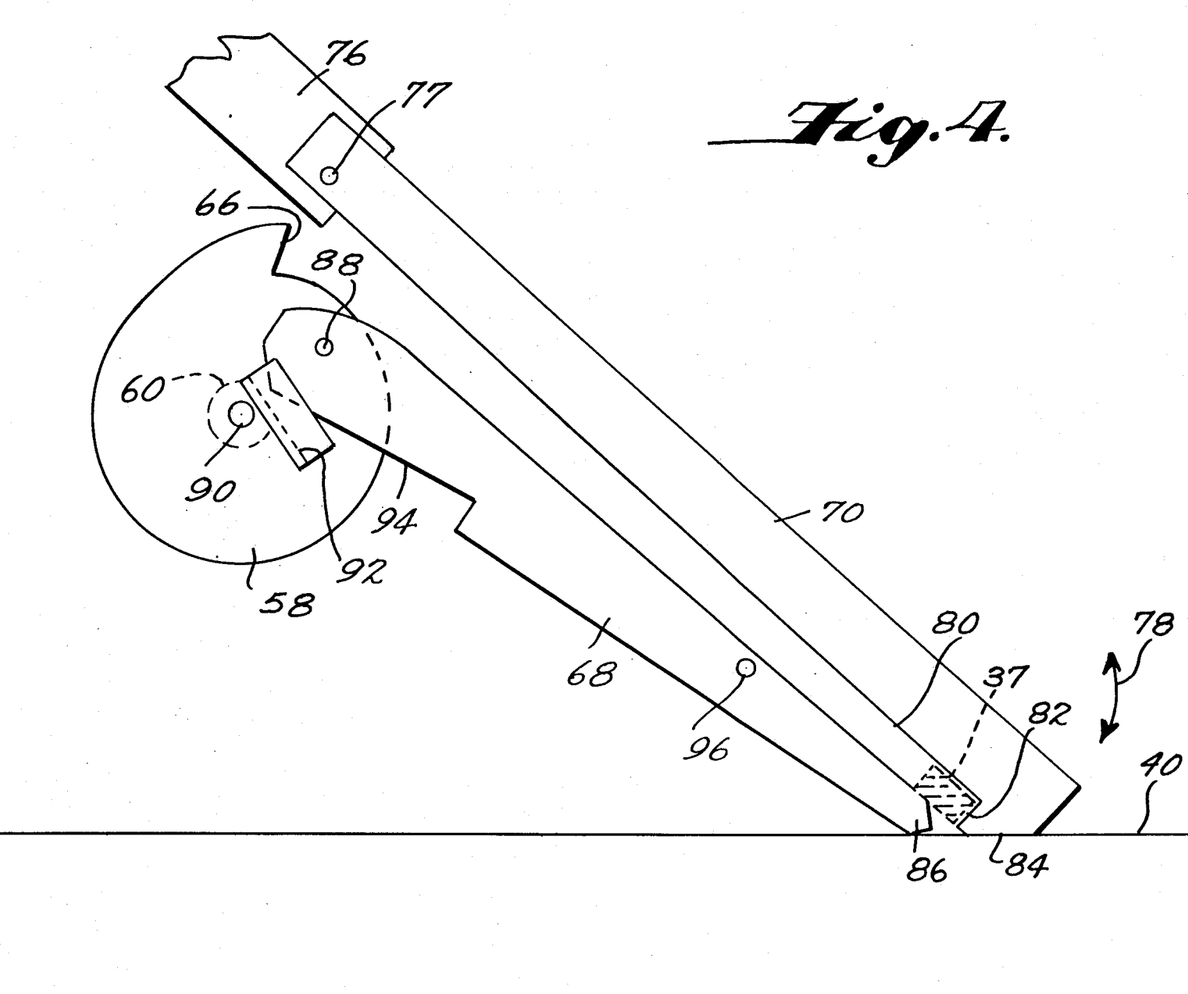
FIG. 4 is a schematic illustration in side elevation of a pair of guide arms of the present invention.

With reference now to FIG. 4, the operation of the guide arms 68 and 70 will now be described.

The upper guide arm 70 has its first or upper end mounted for pivotable movement about a fixed axis such as a pin or rivet 74, which in turn is mounted on an arm 76 depending from the frame 30, previously mentioned. The arm 70 is freely movable about the pivot 77 generally in a direction of the arrows 78. The underside at its lower end of the arm 70 has a flat surface 80 and at the extreme end a hook portion defined by another flat surface 82 is provided to restrain downward movement of an article located between the arms 68 and 70. The bottom surface of the hook is flattened at 84 to facilitate resting against the top surface of the layer 40 of the articles being stacked. The surfaces 80 and 82 are mutually orthogonal as illustrated in FIG. 4.

The other guide arm 68 has a lower end 86 that preferably comes to a point as shown. The length of the arm 68 is shorter than the length of arm 70 for the reason that will be explained below. The upper end of the arm 68 is pivotally mounted on a pin 88. The pin 88 is fixed in the face of the cam disk 58 at a fixed radial distance from the axis of rotation 90 of the shaft 60 on which the disk 58 is fixedly mounted. About the periphery of the disk 58, the pickup means or notch 66 is formed in the manner shown and for the purpose discussed above.

Also on the face of the disk 58 at a selected location is an abutment member 92 which is positioned to engage a flattened portion 94 on the underside of the inner end of the arm 68. Intermediate the ends and preferably closer to the lower end 86 of the lower arm 68, an abutment means in the form of a pin 96 from the side surface of the arm 68. Alternately, the pin 96 may be located in a corresponding position on the upper arm 70. In either arrangement, when the lower arm 68 is moved upwardly, after a predetermined travel, the pin 96 will cause interengagement between the arm 68 and 70 and effect lifting of the arm 70 with continued movement of the arm 68. In operation, the cam disk 58 will commence movement from a position beneath the feed slot 75 formed on the lower edge 56 of each associated magazine and will be moved clockwise on the shaft 60 to bring a single spacing member clockwise about the shaft 60. Upon continued rotation of the cam disk 58, the spacing member will slide over the upper end of the arm 68 and begin travel down the path defined between the facing edges of the guide arms 68 and 70 to the lower ends thereof. As will be evident, with the disk 58 rotated fully counterclockwise to the loading position for the notch 66, the first end and pivot axis 88 of the arm 68 will be located at a predetermined distance from the pivot axis 77 whereas as the disk 58 rotates clockwise, a selected spacing member 37 carried by notch 66 will be fed into the space provided between the arm 68 and 70. In one embodiment, the weight of the spacing member and the angle of inclination of the arm 68 and 70 will be such that gravity will effect movement of the spacing member 37 along the length of the arm 68 and 70 to the lower end of the arm 68 and 70. Where the spacing members 37 have a rectangular cross-section as shown in FIG. 4, one flat side thereof will engage the surface 82 of the arm 70 while the upper side thereof will engage the surface 80. This will provide a selected orientation to the member 37 so that when the arm 68 commences its travel from its position illustrated in FIG. 4 back to the loading position upon counterclockwise rotation of the disk 58, the lower end 86 of arm 68 will move out from underneath the immediately adjacent edge of the spacing member 37 to allow the spacing member 37 to fall flat with the long side thereof in engagement with the surface of the layer 40. Continued counterclockwise rotation of the disk 58 will eventually bring the abutment member 92 into engagement with the surface 94 to effect vertical lifting of the lower end 86 of the arm 68 whereupon the abutment pin 96 will engage the surface 80 of the upper guide arm 70 and effect pivoting of the arm 70 upwardly or in a counterclockwise direction about the fixed pivot axis 77. With all of the guide arms lifted away from the surface of the layer 40, a new layer of articles or wood planks 40 may be inserted by a worker, whereupon the sequence of operation for placing another layer of spacing members 37 thereon may be commenced.

In the illustrated preferred embodiment, as the disk 58 rotates from its loading position to the forward position, the abutment member 92 will maintain the arm 68 in an upward position and since the arm 70 has a longer length dimension its forward surface 84 will engage the top surface of the layer 40 before the arm 68 has been fully projected to its forward position. Thus, the engagement of the forward surface 84 with layer 40 will, in effect, cause separation of the arms 68 and 70 with the length dimension of the arm 68 serving as an upper limit for the space to be provided between the arms 68 and 70. By precisely controlling this space between the arm 68 and 70 when the disk 58 has reached its forward rotation limit, a high degree of control of the orientation of the spacing member 70 as it travels down between the arm 68 and 70 will be effected.

While the foregoing embodiment provides a high degree of control for movement in orientation of a specifically shaped spacing member 37, it will be apparent to those skilled in the art that where less control is required, certain features of the foregoing embodiment may be modified. For example, the arms 68 and 70 could be of the same length and both have straight ends where the article to be deposited had no preferred orientation on the layer 40 on which it is to be located. Similarly, the arm 68 could be fixedly mounted about an axis 88 where the weight of the article to be deposited was sufficient to effect its travel down between the guide arms 68 and 70. Other alternatives will, of course, be apparent to those skilled in this art.

Figure 5:
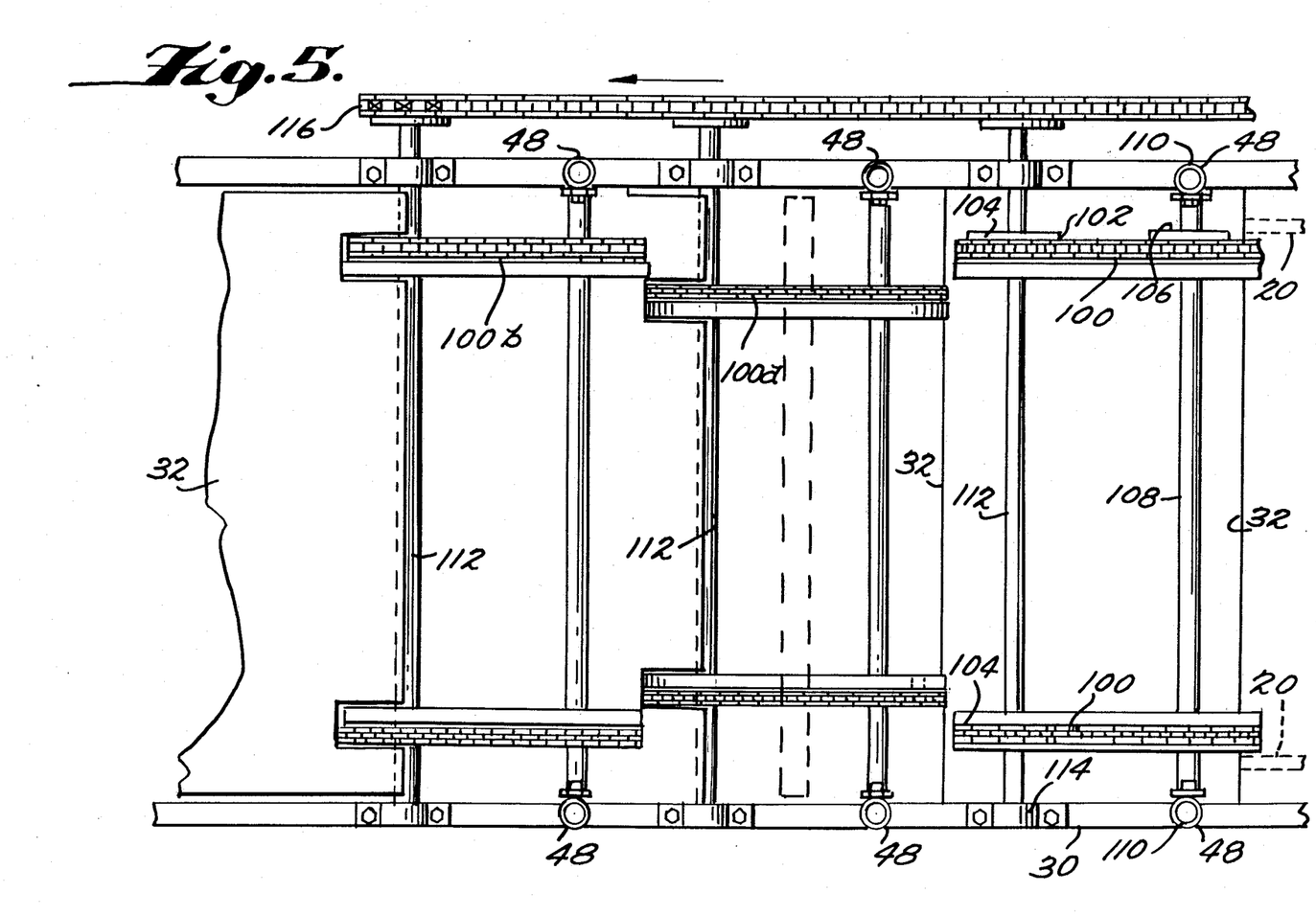
FIG. 5 is a top plan view with parts broken away illustrating the distributing conveyors for the magazines of the present invention.

With reference now to FIG. 5, there is illustrated a top plan view, with parts broken away, of the distributor conveyor means utilized to feed spacing members to each of the magazines 32 of the present invention. In FIG. 5, the spacing members are fed from the right hand side on the accumulator conveyor chains 20 to a leading pair of distributor conveyors 100. Each conveyor 100 includes an endless chain 102 mounted on spaced pulleys or sprockets 104 and 106. The forward sprocket 106, relative to the direction of travel of the spacing members on conveyor 20, has a smaller diameter relative to the rearwardly located sprocket 104. The forward sprockets 106 are also mounted on a shaft 108, the ends of which are pivotally connected, preferably by a clevis at 110, to the end of a piston rod of a pneumatic ram 48. The rearwardly located sprockets 104 are mounted on a driven shaft 112 with the shaft 112 having its outer portions rotatably mounted in bearing members 114 on frame 30.

Immediately beneath the forward portion of each conveyor 100, there is located the upper portion of an associated magazine 32.

With reference to FIG. 2, it will be apparent that as the forward ends of the conveyors 100 are lifted, as shown at 46 in FIG. 2, the immediately preceeding conveyor 100 or in the case of the first one of this set, the accumulator conveyors chains 20 will supply the spacing members to the magazine located thereunder.

Also as shown in FIG. 5, all of the conveyors 100, 100a, 100b . . . 100n will be alternately staggered in their spacing along their associated support shafts 108, 112 so that they may partially overlap at their leading and trailing portions to assure smooth feeding of spacing members over top of the magazines to be fed. A common drive chain 116 may be employed to drive each of the drive shafts 112 of each of the conveyor sets. With this arrangement, relatively quick and accurate feeding of a desired number of spacing members can be sequentially accomplished to each of the magazines 32 to provide an uninterupted supply of the spacing members 37 to the stacking area 38.

Having described the invention, it will be apparent to those skilled in the art that various modifications may be made thereto without departing from the spirit and scope of this invention as defined in the appended claims.

What is claimed is:

1. Means for delivering a member from magazine means containing a plurality of said members to a depository location comprising a pair of cooperating guide means, each guide means having a first end and an opposite, second end, said first end of one of said guide means having means for moving said first end thereof between a loading position where said first ends of said guide means are spaced apart a predetermined distance and another position wherein said first ends are farther apart from one another than said predetermined distance so that, when said first end of said one of said guide means is moved from said loading position a said member will be moved from the magazine means to be guided by said guide means and along said guide means from a point adjacent a said first end toward said depository location and, when said first ends of said guide means move toward said another position, a said member will be moved in substantial contact with at least one of said guide means toward said second ends of said guide means for discharge from said guide means.

2. The apparatus as claimed in claim 1, wherein said pair of guide means comprise first and second elongated arms, said first arm having said first end having means for moving said first end thereof, said second arm having its said first end mounted on frame means for pivoting movement of said second arm about a first fixed axis.

3. Means for delivering a member from magazine means containing a plurality of said members to a depository location comprising a pair of cooperating guide means, each guide means having a first end and an opposite, second end, said first end of one of said guide means having means for moving said first end thereof between a loading position where said first ends of said guide means are spaced apart a predetermined distance and another position wherein said first ends are farther apart from one another than said predetermined distance so that, when said first end of said one of said guide means is moved from said loading position a said member will be moved form the magazine means to be guided by said guide means towards said depository location and, when said first ends of said guide means move toward said another position, a said member will be moved toward said second ends of said guide means for discharge from said guide means; said pair of guide means comprising first and second elongated arms, said first arm having means for moving said first end thereof, said second arm having its said first end mounted on frame means for pivoting movement of said second arm about a first fixed axis, said means for moving said first end including rotatable pivot means comprising a second fixed axis spaced a distance from said first fixed axis, said first arm having its first end fixedly connected to said pivot means at a radial distance from said second fixed axis so that, upon rotary movement of said pivot means, said first end of said first arm will move through an arcuate path between said loading position and said another position.

4. The apparatus as claimed in claim 3, wherein said first fixed axis of said second arm is located vertically above said second fixed axis of said first arm.

5. The apparatus as claimed in claim 4, wherein said first arm includes, intermediate its said ends, abutment means, said second arm being freely pivotable about said first fixed axis so that said second arm engages said abutment means of said first arm at least during movement of said first arm between said loading and another positions.

6. The apparatus as claimed in claim 5, wherein said magazine means comprises a sloped surface extending from an upper portion to a lower portion and on which said members are stacked to be fed by gravity from said upper portion to said lower portion of said surface, said pivot means including pick means for engaging the lowermost one of said members from said surface and moving said lowermost one of said members to a position between said first and second arms, said pick means being operable upon rotation of said pivot means to move said first end of said first arm through said arcuate path between said loading position and said another position.

7. The apparatus as claimed in claim 6, wherein, when in said loading position, said first arm extends substantially at an angle of between 0° and 25° to the horizontal, and upon movement to said another position, said first arm extends downwardly at an angle to the horizontal sufficient to allow a member disposed between said first and second arms to slide between said arms to said second ends thereof for discharge from between said arms.

8. Means for delivering a member from magazine means containing a plurality of said members to a subjacent depository surface comprising first and second cooperating guide means, each guide means having a first end and an opposite, second end, said first end of said first guide means having means for moving said first end thereof about a fixed axis of rotation between a first position where said second ends of said guide means are disposed above said surface and another position wherein said second ends are in contact with the surface, said second guide means having its said first end mounted on a frame means for pivotable movement of said second guide means about a fixed axis, said fixed axis being located above said first end of said first guide means relative to said surface, said first end of said first guide means being pivotally connected to said moving means at a fixed radial distance from said axis of rotation of said moving means, said first guide means having, intermediate its said ends, abutment means, said second guide means engaging said abutment means when said first end of said first guide means is in said first position and during at least a portion of the travel of said first end of said first guide means from said first position towards said another position, said second guide means having a length dimension such that its said second end will engage said surface before said second end of said first guide means when said first end of said first guide means moves into said another position whereby said second guide means will be moved out of engagement with said abutment means to thereby release any member disposed between said guide means as said first end of said first guide means is moved from said another position toward said first position.

9. The apparatus as claimed in claim 8, wherein said first and second guide means are first and second elongated arms, respectively, said first arm having said first end having said means for moving said first end thereof, said second arm having its said first end mounted on frame means for pivoting movement of said second arm about said first fixed axis.

10. The apparatus as claimed in claim 9, wherein said means for moving said first end includes rotatable pivot means with said fixed axis of rotation constituting a second fixed axis spaced a distance from said first fixed axis, so that upon rotary movement of said pivot means, said first end of said first arm will move through an arcuate path between said first and said another positions.

11. The apparatus as claimed in claim 10, wherein said magazine means comprises a sloped portion extending from an upper portion to a lower portion and on which said members are stacked to be fed by gravity from said upper portion to said lower portion of said portion, said pivot means including pick means for engaging the lowermost one of said members from said portion and moving said lowermost one of said members to a position between said first and second arms, said pick means being operable upon rotation of said pivot means to move said first end of said first arm through said arcuate path between said first position and said another position.

12. The apparatus as claimed in claim 11, wherein, when in said first position, said first arm extends substantially at an angle of between 0° and 25° to the horizontal, and upon movement to said another position, said first arm extends downwardly at an angle to the horizontal sufficient to allow a member disposed between said first and second arms to slide between said arms to said second ends thereof for discharge from between said arms.

13. Means for delivering a member from magazine means containing a plurality of said members to a depository location comprising a pair of cooperating guide means, each guide means having a first end and an opposite, second end, said first end of one of said guide means having means for moving said first end thereof between a loading position where said first ends of said guide means are spaced apart a predetermined distance and another position wherein said first ends are farther apart from one another than said predetermined distance so that, when said first end of said one of said guide means is moved from said loading position a said member will be moved from the magazine means to be guided by said guide means and along said guide means from a point adjacent a said first end toward said depository location and, when said first ends of said guide means move toward said another position, a said member will be moved in substantial contact with at least one of said guide means towards said second ends of said guide means for discharge from said guide means, said magazine means comprising a plurality of magazine stations spaced apart over a stacking area, said loading position including conveyor means and said plurality of magazine stations having a distributor conveyor means substantially spanning said magazine stations, said conveyor means being positioned to feed spacing members from said loading position to said distributor conveyor means, each magazine station including a magazine and distributor means for delivering spacing members from said distributor conveyor means to a said respective magazine, each magazine station having means for delivering a spacing member from said respective magazine, each magazine station having said means for delivering a member from said magazine means to said depository location.

14. The apparatus as claimed in claim 13, wherein said means for delivering a member from said magazine means further comprises said means for moving said first end thereof including a fixed axis of rotation between said loading position where said second end of said guide means are disposed about said location and said another position wherein said second ends are in contact with the location, said second guide means having its said first end mounted on a frame means for pivotable movement of said second guide means abut a fixed axis, said axis being located above said first end of said first guide means being pivotally connected to said moving means at a fixed radial distance from said axis of rotation of said moving means, one of said guide means having, intermediate its said ends, abutment means, the other said guide means engaging said abutment means when said first end of said first guide means is in said loading position and during at least a portion of the travel of said first end of said first guide means for said loading position towards said another position, said second guide means having a length dimension such that its said second end will engage said location before said second end of said first guide means when said first end of said first guide means moves into said another position whereby said second guide means will be moved out of engagement with said abutment means to thereby release any member disposed between said guide means as said first end of said first guide means is moved from said another position toward said loading position.

15. The apparatus as claimed in claim 14, wherein said means for moving said first end of said first guide means comprises disk means mounted for rotation about said axis of rotation, said first end of said first guide means being pivotally connected to said disk means at a selected radial distance from said axis of rotation thereof.

16. The apparatus as claimed in claim 15, wherein said disk means has a face and an abutment member is mounted on said face to engage said first guide means as said disk means is rotated in a direction corresponding to movement of said first end of said first guide means from said another position whereby said abutment member will lift said first guide means away from said location.

17. The apparatus as claimed in claim 16, wherein said abutment means on said first guide means is positioned thereon to engage and lift said second guide means away from said location after a predetermined length of travel of said first end of said first guide means from said another position toward said first position.

18. The apparatus as claimed in claim 17, wherein the spacing members are elongated members having generally rectangular cross-sections having flat sides and said second end of said second guide means includes a first flat surface for engaging one side of a said elongated member and a second flat surface extending generally perpendicular to said first flat surface for engaging another side of a said elongated member, said second flat surface extending in the general direction of said first guide means.

19. The apparatus as claimed in claim 18, wherein said first guide means includes a flat surface which extends generally parallel to said first flat surface of said second guide means when said guide means are in said another position.

* * * * *